(12) United States Patent
Ziemer

(10) Patent No.: US 8,894,532 B2
(45) Date of Patent: *Nov. 25, 2014

(54) ARRANGEMENT COMPRISING AT LEAST ONE DOG CLUTCH

(75) Inventor: Peter Ziemer, Tettnang (DE)

(73) Assignee: ZF Friedrichshafen AG, Friedrichshafen (DE)

(*) Notice: Subject to any disclaimer, the term of this patent is extended or adjusted under 35 U.S.C. 154(b) by 318 days.

This patent is subject to a terminal disclaimer.

(21) Appl. No.: 13/375,794

(22) PCT Filed: May 19, 2010

(86) PCT No.: PCT/EP2010/056907
§ 371 (c)(1),
(2), (4) Date: Dec. 2, 2011

(87) PCT Pub. No.: WO2010/139557
PCT Pub. Date: Dec. 9, 2010

(65) Prior Publication Data
US 2012/0085616 A1    Apr. 12, 2012

(30) Foreign Application Priority Data
Jun. 4, 2009   (DE) .......................... 10 2009 026 708

(51) Int. Cl.
*F16H 3/44* (2006.01)
*F16D 25/061* (2006.01)

(52) U.S. Cl.
CPC .................................. *F16D 25/061* (2013.01)
USPC ........................... 475/269; 475/298; 475/303

(58) Field of Classification Search
USPC ............ 475/298, 300, 138; 192/85.18, 85.38, 192/85.37
See application file for complete search history.

(56) References Cited

U.S. PATENT DOCUMENTS

| | | | |
|---|---|---|---|
| 2,633,218 A * | 3/1953 | Pielstick | 192/85.18 |
| 3,444,972 A * | 5/1969 | Carstensen et al. | 192/85.18 |
| 4,359,145 A | 11/1982 | Huff | |
| 5,019,022 A | 5/1991 | Uhlig et al. | |
| 5,667,330 A | 9/1997 | Henkel et al. | |
| 5,679,096 A | 10/1997 | Stine et al. | |
| 6,079,539 A | 6/2000 | Fetcho et al. | |
| 6,131,686 A | 10/2000 | Scotti et al. | |
| 6,315,691 B1 * | 11/2001 | Fredriksen et al. | 475/72 |
| 7,198,143 B2 | 4/2007 | Legner | |
| 7,278,942 B2 | 10/2007 | Klemen et al. | |
| 7,331,894 B2 | 2/2008 | Sowul et al. | |

(Continued)

FOREIGN PATENT DOCUMENTS

| | | |
|---|---|---|
| CH | 304 821 | 1/1955 |
| DE | 634 500 | 12/1934 |

(Continued)

*Primary Examiner* — Troy Chambers
*Assistant Examiner* — Ryan Dodd
(74) *Attorney, Agent, or Firm* — Davis & Bujold, PLLC; Michael J. Bujold

(57) ABSTRACT

An arrangement comprising at least one dog clutch which is shiftable for coupling and decoupling a shaft and a component at a transmission. An actuating piston (5) is disposed axially movable, at least to some extent, within the shaft for moving a shifting claw (9) of the dog clutch into a disengaged state and an engaged state. The actuating piston (5) can be pressurized, on both sides, with a pressurizing medium so that the actuating piston (5) can be hydraulically actuated in both directions of movement.

20 Claims, 3 Drawing Sheets

(56) References Cited

U.S. PATENT DOCUMENTS

| | | |
|---|---|---|
| 7,357,235 B2 | 4/2008 | Schmidt et al. |
| 7,419,041 B2 | 9/2008 | Diemer et al. |
| 7,789,792 B2 | 9/2010 | Kamm et al. |
| 8,460,144 B2 * | 6/2013 | Ziemer .................. 475/146 |
| 8,617,026 B2 * | 12/2013 | Raszkowski ............ 475/343 |
| 2006/0040782 A1 | 2/2006 | Diemer et al. |
| 2009/0163314 A1 | 6/2009 | Bock et al. |
| 2009/0301248 A1 | 12/2009 | Mohr et al. |
| 2010/0043586 A1 | 2/2010 | Mohr et al. |

FOREIGN PATENT DOCUMENTS

| | | |
|---|---|---|
| DE | 866 290 | 7/1949 |
| DE | 1 550 769 | 7/1969 |
| DE | 2 316 560 | 10/1973 |
| DE | 2 246 123 | 3/1974 |
| DE | 39 28 133 A1 | 3/1990 |
| DE | 38 36 956 A1 | 5/1990 |
| DE | 199 01 414 A1 | 7/2000 |
| DE | 697 07 954 T2 | 6/2002 |
| DE | 102 29 515 A1 | 1/2004 |
| DE | 103 05 434 A1 | 7/2004 |
| DE | 103 34 450 A1 | 2/2005 |
| DE | 10 2005 035 156 A1 | 3/2006 |
| DE | 10 2005 037 402 A1 | 3/2006 |
| DE | 10 2005 038 925 A1 | 3/2006 |
| DE | 10 2005 002 337 A1 | 8/2006 |
| DE | 10 2006 022 176 A1 | 11/2007 |
| DE | 10 2006 049 274 A1 | 4/2008 |
| DE | 10 2006 049 281 A1 | 4/2008 |
| DE | 10 2008 010 064 A1 | 8/2009 |
| GB | 1 367 433 | 9/1974 |
| GB | 2 368 102 A | 4/2002 |
| WO | 2005/008096 A1 | 1/2005 |

* cited by examiner

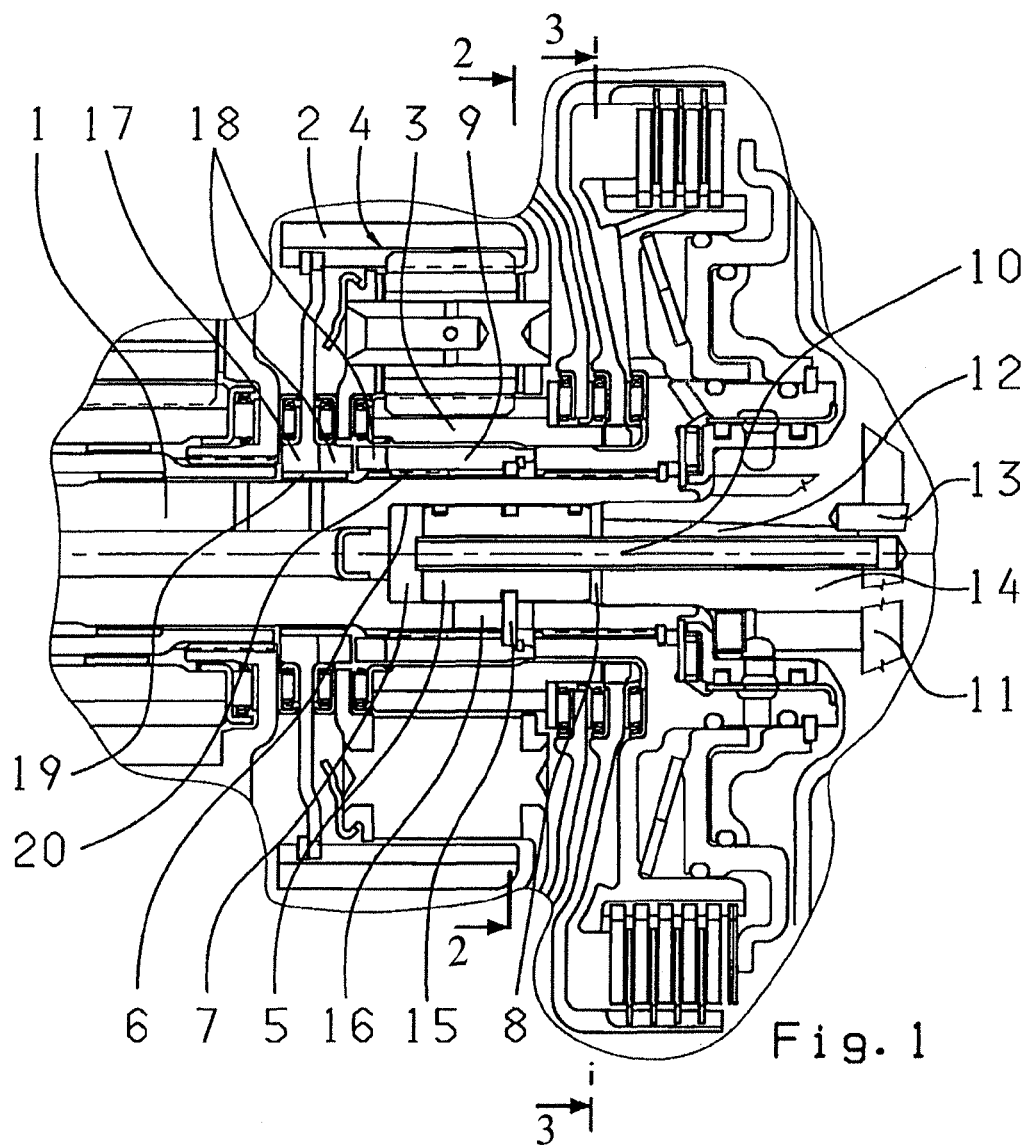
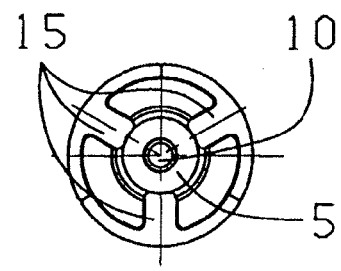 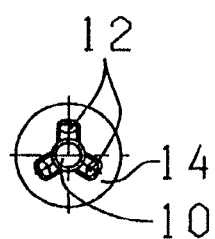
Fig. 1
Fig. 2
Fig. 3

ARRANGEMENT COMPRISING AT LEAST ONE DOG CLUTCH

This application is a National Stage completion of PCT/EP2010/056907 filed May 19, 2010, which claims priority from German patent application serial no. 10 2009 026 708.5 filed Jun. 4, 2009.

FIELD OF THE INVENTION

The present invention relates to an arrangement having at least one dog clutch.

BACKGROUND OF THE INVENTION

Arrangements comprising at least one dog clutch as a shifting element for connecting a shaft of a transmission to a component are known from automotive technology. An automatic transmission having a device for decoupling the transmission from a drive train of a vehicle, for example, is disclosed in the document GB 2 368 102 A. The device is designed as a dog clutch that is hydraulically actuated by means of an actuating piston disposed in the interior of a shaft. The actuating piston is subjected to pressure on one side in order to move it against a return spring. A shifting finger which is coupled to the actuating piston and guided through a recess of the shaft is used to actuate the shifting claw.

Furthermore, another arrangement having a dog clutch as a shifting element is known from the document U.S. Pat. No. 5,667,330 A. In this disclosed arrangement, the dog clutch is used to connect a power take-off drive to a transmission output shaft of a traction engine. For this purpose, hydraulic pressure is applied to one side of an actuating piston in the interior of an output shaft so that it is pressed against a return spring, where the shifting claw is actuated by means of a bolt, which is guided by the actuating piston through a recess of the output shaft to the shifting claw.

Because a return spring is absolutely necessary for resetting the actuating piston with the disclosed arrangements, considerable construction space is required for housing the return spring.

SUMMARY OF THE INVENTION

The problem addressed by the present invention is to provide a dog clutch in a transmission in an arrangement that saves as much space as possible.

Accordingly, an arrangement having at least one dog clutch or the like for a shiftable coupling and decoupling between at least one shaft and at least one component with a transmission is proposed, where an actuating piston or the like is disposed in an axially movable manner at least partially in the interior of the shaft for moving a shifting claw of the dog clutch into an disengaged and engaged state. According to the invention, the actuating piston can now be supplied with pressurizing medium on both sides so that the actuating piston can be hydraulically actuated in both directions of movement in order to engage and disengage the dog clutch.

The hydraulic actuation on both sides has, among other things, the advantage that a return spring is no longer required. In addition, the arrangement according to the invention allows the holding pressure in the engaged state to be set lower, due to the absence of the return spring. Furthermore, the engaged or closed state, and the disengaged or open state of the shifting claw can be maintained without a corresponding pressure in the system.

Preferably, the actuating piston in the arrangement according to the invention can be guided, for instance, centrically into the interior of the shaft to be coupled, for example, the drive shaft of an automatic transmission in planetary design. Other possible arrangements of the actuating piston are also conceivable, however.

In the scope of one possible variant embodiment of the present invention, in order for the dog clutch to be disengaged, a first piston chamber of the actuating piston facing away from a hub fixed to the housing can be supplied with a pressurizing medium, and in order for the dog clutch to be engaged, a second piston chamber of the actuating piston facing toward the hub can be supplied with a pressurizing medium. The hub can preferably be designed as a cover fixed to the housing or the like of the transmission. Other structural designs are, however, also feasible.

In order to supply the pressurizing medium to the first piston chamber, a tube or the like connected to a pressurizing medium supply channel can be press fit into the hub, for example, and guided through the actuating piston into the first piston chamber. This allows a pressurizing medium to be appropriately applied to the actuating piston so that the dog clutch can be disengaged.

At least one opening or the like can be provided in the hub so that the pressurizing medium can also be applied to the second piston chamber in order to engage the dog clutch. At least one pressurizing medium feed channel can be designed as an opening, which is connected on one side to the pressurizing medium supply channel and on the other side to the second piston chamber.

In order to hydraulically actuate both sides of the actuating piston, a further variant embodiment of the invention provides for an axial extension or the like on the actuating piston for mounting on a further shaft, where the extension is mounted in a recess connected to a pressurizing medium supply channel or the like. The shaft provided for mounting the actuating piston can preferably be implemented as a drive shaft of the automatic transmission. Alternatively, however, mounting can also be to the housing or the like.

In a further development of this variant embodiment, the extension is given a pin-shaped design, for example. In this pin-shaped design, the actuating piston can have an axial through opening that connects the first piston chamber to the recess for the supply of pressurizing medium. In this variant embodiment, the second piston chamber can be connected directly to a further pressurizing medium supply channel for supplying pressurizing medium for engaging the dog clutch.

In a next variant embodiment, the extension is designed as a projection or the like, which forms a first pressurizable surface in the recess for disengaging the dog clutch, and a second pressurizable surface for engaging the dog clutch on the projection. The piston chamber assigned to the first pressurizable surface can be connected to a first pressurizing medium supply channel, and the piston chamber assigned to the second pressurizable surface can be connected to a second pressurizing medium supply channel in order to supply or apply the pressurizing medium.

The aforementioned variant embodiment has the advantage that no tube is needed to supply the pressurizing medium that is guided through the actuating piston.

Independent of the respective variant embodiment, the shifting claw can be coaxial to the drive shaft, abutting at its outer periphery for example, where the actuating piston is preferably disposed in the interior of the drive shaft, in a bore or the like for example. In this design, the shifting claw can preferably be actuated using at least one bolt or the like extending through the drive shaft that is connected or coupled to the actuating piston. Other types of actuation for the dog clutch are also possible.

In another variant for actuating the dog clutch, the actuating piston can be coupled to the shifting claw by means of several driving fingers extending radially through the drive shaft for axial travel. The driving fingers can form a quasi-anchor plate or the like, for example, whose radial carrier is formed by the driving finger. Preferably, a number of driving fingers are provided, disposed around the periphery at a predetermined angle to one another. In this manner, planar contact can be achieved both at the shifting claw and also at the actuating piston, which will allow tipping or jamming to be securely avoided.

Preferably, a clearance fit can be provided between the inner diameter of the bore in the drive shaft and the outer diameter of the actuating piston. This will allow the actuating piston to move freely, and also provide a seal between the flows of pressurizing medium in order to engage and disengage the shifting claw, and thus couple the drive shaft with and decouple it from the component of the planetary gear set.

Independent of the respective variant embodiment, the shifting claw and the corresponding counterpart on the component to be shifted can be connected, for example by means of a common crown gearing or by means of a common spline or the like.

According to one advantageous further development, the crown gearing or the spline of the shifting claw halves may be designed to be crowned or conical, or to be undercut and/or have a bevel or a radius on the face side and/or with a centering cone.

Preferably, a ring gear or a sun gear as a component of the planetary gear set can be coupled to the shifting claw and therefore to the drive shaft or the like. However, other components of the planetary gear set can also be shifted with the shifting claw.

However, it is also possible that the shifting claw is connected to the drive shaft and thereby centered in a rotationally fixed manner. The corresponding counterpart of the shifting claw, at the ring gear of the planetary gear set, for example, is preferably mounted on the drive shaft by means of a plain bearing or the like.

Independent of the respective variant embodiment, the arrangement according to the invention can have spring elements for pre-positioning the actuating piston in the pressure-less state. A compression spring in the piston chamber can be used, for example, for the disengaged state of the shifting claw or for the engaged estate of a shifting claw.

BRIEF DESCRIPTION OF THE DRAWINGS

The present invention will be explained in greater detail below with reference to the figures. The figures show the following:

FIG. 1 a schematic, cutaway section view of a first possible variant embodiment of an arrangement according to the invention having a dog clutch in an automatic transmission in planetary design;

FIG. 2 a schematic, cutaway partial view along the cutting line 2-2 according to FIG. 1;

FIG. 3 a schematic, cutaway partial view along the cutting line 3-3 according to FIG. 1;

DETAILED DESCRIPTION OF THE PREFERRED EMBODIMENTS

Figure 4:
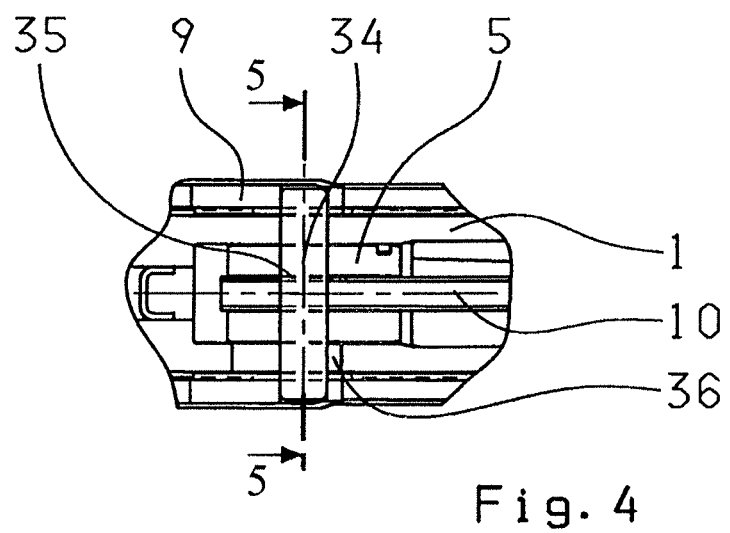
FIG. 4 a schematic, cutaway partial view of a variant of the shifting claw take-along with the arrangement.

In the figures, different variant embodiments of an arrangement according to the invention having a dog clutch for shiftable coupling and decoupling of a drive shaft 1 of an automatic transmission in planetary design are represented as examples together with at least one component of the planetary gear set 4, where a ring gear 2 or a sun gear 3 of the planetary gear set 4 is used as an example of a component to be connected that can be coupled to the drive shaft 1 using the shifting claw 9 of the dog clutch. The same components are denoted by the same reference numbers in the different figures.

The dog clutch is disposed centrally, for the most part within a sun gear 3 of the planetary gear set 4, in order to implement an arrangement of the dog clutch in the automatic transmission in a space-saving manner.

Independent of the respective variant embodiment, according to the invention the dog clutch can be hydraulically activated on both sides, where the pressurizing medium is supplied in an advantageous manner from only one side. This results in a particularly favorable arrangement with respect to construction space. Furthermore, in contrast to a one-sided hydraulic actuation with return spring, the exclusively hydraulic actuation offers the advantage, among others, that the holding pressure in the engaged state can be lower, and that even without pressure in the system, the engaged or disengaged state can be maintained.

FIGS. 1 to 3 show a first variant embodiment of the arrangement. As already mentioned, a bilateral hydraulic actuation of the actuating piston 5 is implemented in both movement directions, where the control, however, occurs from only one side.

The actuating piston 5 is mounted in a central bore 6 provided in the interior of the drive shaft 1 such that it is axially movable. A first piston chamber 7 and a second piston chamber 8 are formed in the bore 6, where the actuating piston 5 is moved toward the right in the drawing plane by pressurizing the first piston chamber 7 so that the dog clutch is disengaged, and the shifting claw 9 of the dog clutch is moved into a disengaged state, and where the actuating piston 5 is moved toward the left in the drawing plane by pressurizing the second piston chamber 8 so that the dog clutch is engaged and the shifting claw 9 is moved into an engaged state.

In order to pressurize the first piston chamber 7, a tube 10 is press fit into a housing cover 14 or pin as a hub for mounting the drive shaft 1. The tube 10 is disposed in such a way that it is guided through the actuating piston 5. As a result, the tube 10 (claw open) connects the first piston chamber 7 to the pressurizing medium supply channel 11. In this way, it is possible to ensure that the first piston chamber 7 is supplied with pressurizing medium in order to move the actuating piston 5 toward the right in the drawing plane as needed, thereby bringing the shifting claw 9 into its open position or into its decoupled position. Furthermore, there are additional feed channels 12 (claw closed) in the cover 14 that guide the pressurizing medium into the second piston chamber 8 in order to move the actuating piston 5 toward the left in the drawing plane when pressurized, thereby bringing the shifting claw 9 into its closed position or into its coupled position. The feed channels 12 are connected to the supply of pressurizing medium via an additional pressurizing medium supply channel 13. Oil, particularly the lubricant or cooling oil of the transmission, for example, can be used as the pressurizing medium.

As seen in FIG. 3, three feed channels 12 provided, disposed around the periphery of the hub or the cover 14, which run radially along the outside of the tube 10 in an axial direction, in order to connect the second piston chamber 8 to the additional pressurizing medium supply channel 13 so that pressurizing medium is supplied.

As seen particularly clearly in FIGS. 1 and 2, the movement of the actuating piston 5 can be transferred, for example via three driving fingers 15. The driving fingers 15 can extend radially through a slot hole 16 in the drive shaft 1, in order to move the shifting claw 9 in an axial direction. Because there are three driving fingers 15, tipping or jamming can be avoided during the transfer of movement. The shifting claw 9 and the corresponding counterpart 17 on the ring gear 2 have a common crown gearing 18. The counterpart 17 on the ring gear 2 is mounted via a plain bearing 19 on the drive shaft 1. The shifting claw 9 is connected to the drive shaft 1 in a rotationally fixed, but axially movable manner by means of a common spine 20, and centered upon it.

As also seen in FIG. 2, the driving fingers 15 have a roughly anchor-shaped design. The constructive shape of the driving fingers 22 results in a quasi-planar contact both at the shifting clutch 9 and at the actuating piston 5.

FIG. 3 clearly shows three feed channels 12 in the cover 14 in order to pressurize the right side or the second pressure chamber 8 of the actuating piston 5 using pressurizing medium, in order to connect the shifting claw 9 to the ring gear 2. The feed channels 12 are disposed in such a way that they are offset from one another at an angle of 120°.

Figure 5:
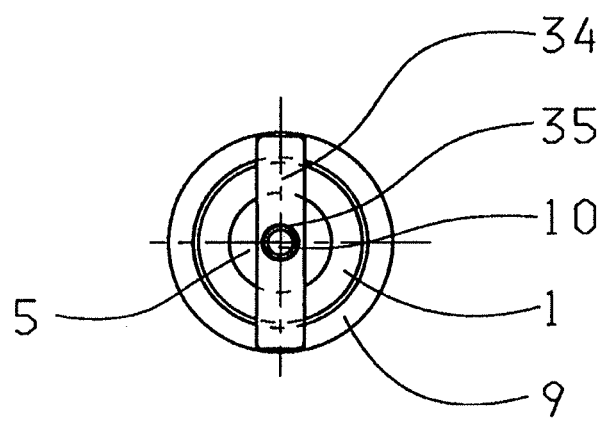
FIG. 5 a schematic, cutaway partial view along the cutting line 5-5 according to FIG. 4.

FIGS. 4 and 5 show an example of a further possibility for transferring movement between the actuating piston 5 and the shifting claw 9. In this type of claw catching, a bolt 34 is provided that connects to the actuating piston 5 and reaches radially through two openings 36 in the drive shaft 1 in order to couple to the shifting claw 9 for its axial movement. The bolt 34 also has a transverse bore 35 through which the tube 10 is guided. When the actuating piston 5 is moved axially, the shifting claw 9 can also be moved correspondingly by means of the bolt 34.

Figure 6:
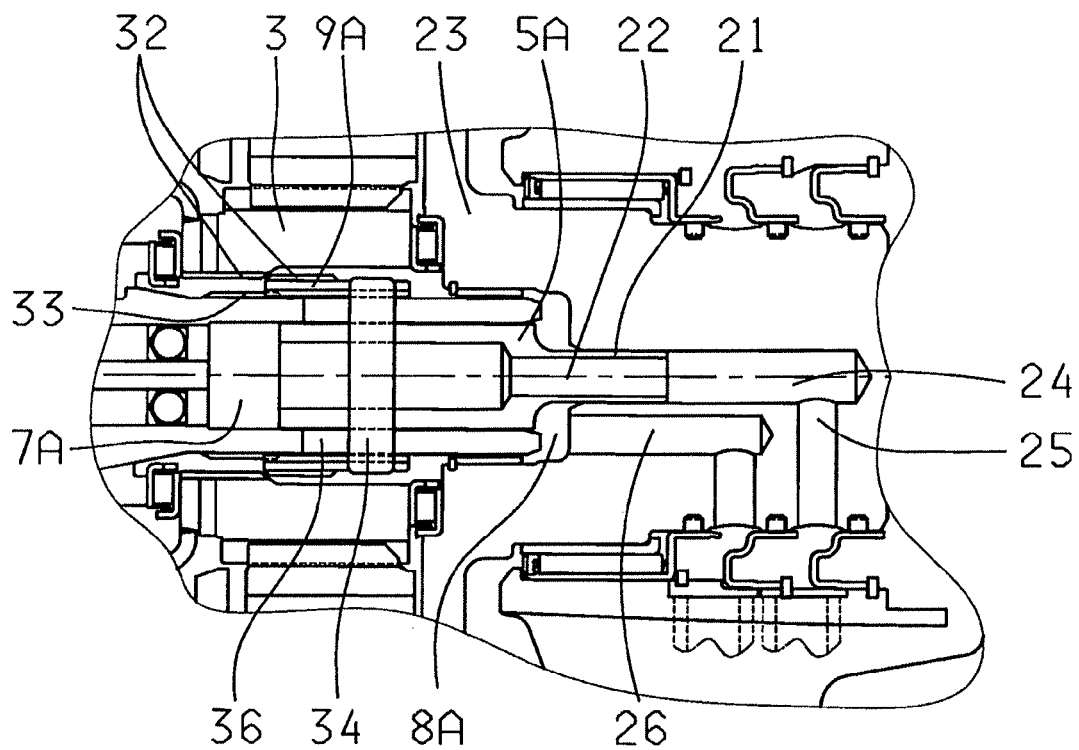
FIG. 6 a schematic, cutaway partial view of a second variant embodiment of the arrangement.

FIG. 6 shows a further variant embodiment of the arrangement according to the invention for the bilateral hydraulic actuation of the dog clutch. In the second variant embodiment, the actuating piston 5A has an extension in the shape of a pin 21. In this manner, the actuating piston 5A is mounted in a recess 24 of a further shaft via the pin 21. In FIG. 6, this additional shaft is an example of an output shaft 23 on the automatic transmission shown. Thus, the actuating piston 5A rotates with the pin 21 in the output shaft 23. In addition, the actuating piston 5A has an axial through opening 22 that connects the recess 24, which is connected to a pressurizing medium supply channel 25, to the first piston chamber 7A through the actuating piston 5A. In this way, pressurizing medium from the supply channel 25 can be guided through the through opening 22 through the actuating piston 5A and into the first piston chamber 7A, so that the pressurization moves actuating piston 5A is moved towards the right in the drawing plane, thereby bringing the shifting claw 9A into its disengaged state.

In the second variant embodiment according to FIG. 6, an additional pressurizing medium supply channel 26 connects the second piston chamber 8A to the pressurizing medium supply in order to move the actuating piston 5A toward the left in the drawing plane. With the pressurization of the second piston chamber 8A, the actuating piston 5A and the shifting claw 9A can be moved toward the left in the drawing plane in order to move these into their engaged state.

Figure 7:
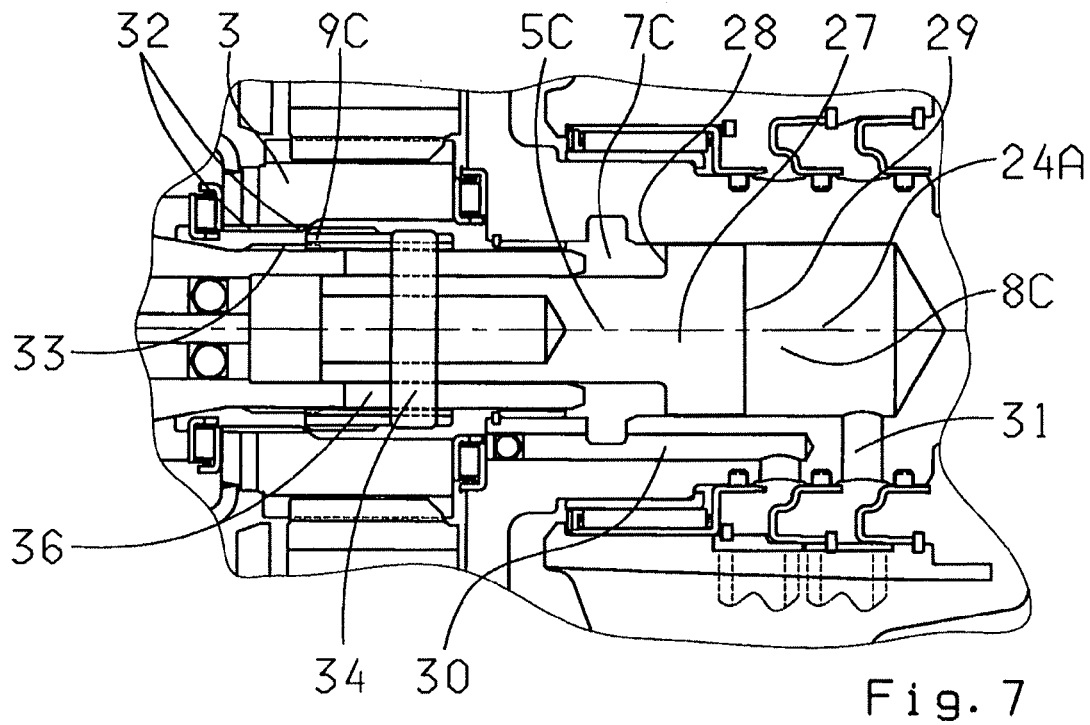
FIG. 7 a schematic, cutaway partial view of a third variant embodiment of the arrangement.

In contrast to the second variant embodiment, in the third variant embodiment according to FIG. 7, the extension is formed as a projection 27 on the actuating piston 5C. In this way, a first pressurizable surface 28, or annular surface is formed in the recess 24A at the projection 27 on the left in the drawing plane. In addition, a second pressurizable surface 29 is formed on the opposite side of the projection 27, on the right side in the drawing plane. The piston chamber 7C assigned to the first pressurizeable surface 28 is supplied with pressurizing medium via a pressurizing medium supply channel 30. The piston chamber 8C assigned to the second pressurizable surface 29 is supplied with pressurizing medium via a further pressurizing medium supply channel 31. In this way, the piston chamber 7C can be pressurized with pressurizing medium via the supply channel 30 in order to disengage the dog clutch so that the actuating piston 5C moves toward the right in the drawing plane. When the piston chamber 8C is pressurized with pressurizing medium via the supply channel 31, the actuating piston 5C can be moved toward the left in the drawing plane in order to disengage the dog clutch. A correspondingly large force can be applied advantageously in order to engage the shifting claw 9C due to the large pressurizable surface 29 at the projection 27.

In the second and the third variant embodiment according to the FIGS. 6 and 7, the drive shaft 1 is connected via the shifting claw 9A, 9C, as an example, to the sun gear 3 of the planetary gear set. For this purpose, the sun gear 3 and the shifting claw 9A, 9C have a common spline 32. The shifting claw 9A, 9C is connected to the drive shaft 1 via a further spline 33 in such a way that it is rotationally fixed but axially movable.

REFERENCE CHARACTERS 1 drive shaft
2 ring gear
3 sun gear
4 planetary gear set
5 actuating piston
5A actuating piston
5C actuating piston
6 bore
7 first piston chamber
7A first piston chamber
7C first piston chamber
8 second piston chamber
8A second piston chamber
8C second piston chamber
9 shifting claw
9A shifting claw
9C shifting claw
10 tube
11 supply channel
12 feed channel
13 supply channel
14 cover or hub, fixed to the housing
15 driving finger
16 slot hole
17 counterpart at the ring gear
18 crown gearing
19 plain bearing
20 spline
21 pin
22 through opening 23 output shaft
24 recess
24A recess
25 supply channel
26 supply channel
27 projection
28 first pressurizable surface or annular surface
29 second pressurizable surface
30 supply channel
31 supply channel
32 spline
33 spline
34 bolt
35 transverse bore
36 opening

The invention claimed is:

1. An arrangement comprising:
at least one dog clutch for shiftable coupling and decoupling at least one shaft with at least one component of a multi-gear transmission,
an actuating piston (5, 5A, 5C) being disposed at least partially axially movable within the shaft in order to move a shifting claw (9, 9A, 9C) of the dog clutch into a disengaged state and an engaged state,
the shifting claw (9, 9A, 9C) being rotationally fixed to the shaft so as to rotate with the shaft and being axially movable along the shaft,
the actuating piston (5, 5A, 5C) being pressurized on both sides, with a pressurizing medium, such that the actuating piston (5, 5A, 5C) being hydraulically actuated in two opposed directions, and the actuating piston (5, 5A, 5C) being guided, at least to some extent, in a central bore (6) provided in an interior of the shaft,
a first piston chamber (7, 7A, 7C) of the actuating piston (5, 5A, 5C) being pressurizable with pressurizing medium for disengaging the dog clutch, and a second piston chamber (8, 8A, 8C) of the actuating piston (5, 5A, 5C) being pressurizable with pressurizing medium for engaging the dog clutch,
a physical tube (10) being connected to a pressurizing medium supply channel (11), the tube (10) being press fit into and fixed to a hub (14) and the hub (14) being fixed to a housing, and the tube (10) being guided through the actuating piston (5) into the first piston chamber (7) for pressurizing the actuating piston (5) with pressurizing medium and disengaging the dog clutch.

2. The arrangement according to claim 1, wherein the actuating piston (5, 5A, 5C) is guided, at least to some extent, in the central bore (6) provided in the interior of the shaft.

3. The arrangement according to claim 1, wherein at least one opening is provided in the hub (14) for pressurizing the actuating piston (5) with pressurizing medium and engaging the dog clutch.

4. The arrangement according to claim 3, wherein at least one pressurizing medium feed channel (12) is provided as an opening in the hub (14) connected, on one side, to a pressurizing medium supply channel (13) and, on an other side, to the second piston chamber (8).

5. The arrangement according to claim 1, wherein the actuating piston (5A, 5C) has an axial extension for mounting on a further shaft, and the extension is mounted in a recess (24, 24A) connected to a pressurizing medium supply channel (25, 31).

6. The arrangement according to claim 5, wherein the projection has a pin-shaped design.

7. The arrangement according to claim 5, wherein the actuating piston (5A) has an axial through opening (22) which connects the first piston chamber (7A) to the recess (24) for supplying pressurizing medium thereto.

8. The arrangement according to claim 5, wherein the second piston chamber (8A) is connected to a further pressurizing medium supply channel (26) for supplying pressurizing medium for engaging the dog clutch.

9. The arrangement according to claim 5, wherein the extension is designed as a projection (27) which forms a first pressurizable surface (28), in the recess (24A), for disengaging the dog clutch and a second pressurizable surface (29) for engaging the dog clutch.

10. The arrangement according to claim 8, wherein the piston chamber (7C), assigned to the first pressurizable surface (28), is connected to a pressurizing medium supply channel (30), and the piston chamber (8C), assigned to the second pressurizable surface (29), is connected to a pressurizing medium supply channel (31).

11. The arrangement according to claim 1, wherein the actuating piston (5, 5A, 5C) is coupled to the shifting claw (9, 9A, 9C), for axial movement, via a plurality of driving fingers (15) extending radially through the drive shaft (1).

12. The arrangement according to claim 1, wherein the shifting claw (9, 9A, 9C) is actuated via at least one bolt (34) of the actuating piston (5, 5A, 5C) which extends radially through the drive shaft (1) and is connected to the shifting claw (9, 9A, 9C).

13. The arrangement according to claim 1, wherein the shifting claw (9, 9A, 9C) and a corresponding counterpart (17) connected with a ring gear (2) to be shifted are connectable via a common crown gearing (18).

14. The arrangement according to claim 8, wherein the shifting claw (5B) and a corresponding counterpart at a sun gear (3) to be shifted are connected via a common spline (32).

15. The arrangement according to claim 13, wherein one of the crown gearing (18) and a spline (32) are at least one of spherical, conical, undercut, beveled, and have a centering cone.

16. The arrangement according to claim 1, wherein the shifting claw (9, 9A, 9C) is connectable to the drive shaft (1) via a spline (33) such that the shifting claw is rotationally fixed to and axially movable along the shaft.

17. An arrangement comprising:
at least one dog clutch for shiftable coupling and decoupling a drive shaft with at least one component of a multi-gear transmission,
an actuating piston (5, 5A, 5C) being disposed at least partially axially movable within the drive shaft,
the shifting claw (9, 9A, 9C) of the dog clutch being rotationally fixed to the shaft so as to rotate with the drive shaft and being axially movable along the drive shaft,
the actuating piston (5, 5A, 5C) being coupled to the shifting claw (9, 9A, 9C) for moving the shifting claw (9, 9A, 9C) axially along the drive shaft into either a disengaged state or an engaged state,
the actuating piston (5, 5A, 5C) being pressurized on both sides, with a pressurizing medium, such that the actuating piston (5, 5A, C) being hydraulically actuated in two opposed directions, and the actuating piston (5, 5A, 5C) being guided, at least to some extent, in a central bore (6) provided in an interior of the drive shaft,
a first piston chamber (7, 7A, 7C) of the actuating piston (5, 5A, 5C) being pressurizable with pressurizing medium for disengaging the dog clutch, and second piston chamber (8, 8A, 8C) of the actuating piston (5, 5A, 5C) being pressurizable with pressurizing medium for engaging the dog clutch, a physical tube (10) being connected to a pressurizing medium supply channel (11), the tube (10) being press fit into and fixed to a hub (14) and the hub (14) being fixed to a housing, and the tube (10) being guided through the actuating piston (5) into communication with the first piston chamber (7) for pressurizing the actuating piston (5) with pressurizing medium and disengaging the dog clutch; and the drive shaft (1) being shiftably connected, via the actuating piston (5, 5A, 5C) and the shifting claw (9, 9A, 9C), to either a ring gear (2) or a sun gear (3) of the planetary gear set (4) of a automatic transmission.

18. An arrangement comprising:

at least one dog clutch for shiftable coupling and decoupling at least one shaft and at least one planetary component of a multi-gear transmission with one another, an actuating piston (5, 5A, 5C) being disposed at least partially axially movable within the shaft, a shifting claw (9, 9A, 9C) being rotationally fixed to the shaft so as to always rotate with the shaft, but the shifting claw (9, 9A, 9C) being axially movable along the shaft, a plurality of driving fingers (15) extending radially through the drive shaft (1) and coupling the actuating piston (5, 5A, 5C) to the shifting claw (9, 9A, 9C) in order to move the shifting claw (9, 9A, 9C) of the dog clutch into a disengaged state and an engaged state, the actuating piston (5, 5A, 5C) being pressurized on both sides, with a pressurizing medium, such that the actuating piston (5, 5A, 5C) being hydraulically actuated in two opposed directions, and the actuating piston (5, 5A, 5C) being guided, at least to some extent, in a central bore (6) provided in an interior of the shaft, and a first piston chamber (7, 7A, 7C) of the actuating piston (5, 5A, 5C) being pressurizable with pressurizing medium for disengaging the dog clutch, and a second piston chamber (8, 8A, 8C) of the actuating piston (5, 5A, 5C) being pressurizable with pressurizing medium for engaging the dog clutch.

19. The arrangement according to claim 1, wherein the actuating piston (5, 5A, 5C) slides axially along an outside of the tube (10).

20. The arrangement according to claim 18, wherein the at least one dog clutch couples and decouples the at least one shaft to at least one component on a planetary transmission.

\* \* \* \* \*